(12) United States Patent
Ledermann et al.

(10) Patent No.: US 8,763,465 B2
(45) Date of Patent: Jul. 1, 2014

(54) METHOD FOR PRODUCING A PRESSURE SENSOR ASSEMBLY AND PRESSURE SENSOR ASSEMBLY

(75) Inventors: Markus Ledermann, Salach (DE); Ralf Kaiser, Althuette (DE); Oliver Stoll, Kirchheim-Teck (DE); Bernhard Panhoelzl, Weinstadt (DE); Christian Roesser, Grossbottwar (DE); Falk Rueth, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 93 days.

(21) Appl. No.: 13/509,956

(22) PCT Filed: Oct. 19, 2010

(86) PCT No.: PCT/EP2010/065692
§ 371 (c)(1),
(2), (4) Date: Aug. 3, 2012

(87) PCT Pub. No.: WO2011/072911
PCT Pub. Date: Jun. 23, 2011

(65) Prior Publication Data
US 2012/0291557 A1  Nov. 22, 2012

(30) Foreign Application Priority Data

Dec. 15, 2009 (DE) .......................... 10 2009 054 689

(51) Int. Cl.
  *G01L 7/00* (2006.01)
(52) U.S. Cl.
  USPC ............................................... 73/700; 73/756
(58) Field of Classification Search
  None
  See application file for complete search history.

(56) References Cited

U.S. PATENT DOCUMENTS

| | | | |
|---|---|---|---|
| 6,092,426 A | 7/2000 | Vollenweider et al. | |
| 6,584,851 B2 * | 7/2003 | Yamagishi et al. | 73/715 |
| 6,619,129 B2 * | 9/2003 | Pitzer | 73/715 |
| 6,619,132 B2 * | 9/2003 | Imai et al. | 73/753 |
| 6,986,285 B2 * | 1/2006 | Avisse | 73/726 |
| 7,150,198 B2 | 12/2006 | Kaneko et al. | |
| 7,363,819 B2 | 4/2008 | Mast et al. | |
| 7,895,897 B2 * | 3/2011 | Kraatz | 73/723 |
| 8,286,496 B2 * | 10/2012 | Sekiya et al. | 73/723 |
| 2005/0139008 A1 | 6/2005 | Kaiser et al. | |

FOREIGN PATENT DOCUMENTS

| | | |
|---|---|---|
| CN | 1284163 | 2/2001 |
| CN | 1188607 | 2/2005 |
| CN | 1651889 | 8/2005 |
| CN | 1806164 | 7/2006 |
| CN | 100344396 | 10/2007 |

(Continued)

OTHER PUBLICATIONS

International Search Report, PCT International Application No. PCT/EP2010/065692, dated Jan. 10, 2011.

*Primary Examiner* — Lisa Caputo
*Assistant Examiner* — Jermaine Jenkins
(74) *Attorney, Agent, or Firm* — Kenyon & Kenyon LLP

(57) ABSTRACT

A method is described for producing a pressure sensor assembly, the pressure sensor assembly having a sensor housing element having a pressure sensor and a base housing element, which have a continuous recess accommodating the pressure sensor and are welded to each other. It is provided that, after the welding, in the area of the welding connection, the recess of the base housing element and/or the sensor housing element is enlarged by material removal. A pressure sensor assembly is also described.

10 Claims, 1 Drawing Sheet

(56) References Cited

FOREIGN PATENT DOCUMENTS

| EP | 0994250 | 4/2000 |
| EP | 1518099 | 3/2005 |
| EP | 1619488 | 1/2006 |
| JP | 2004333139 | 11/2004 |

\* cited by examiner

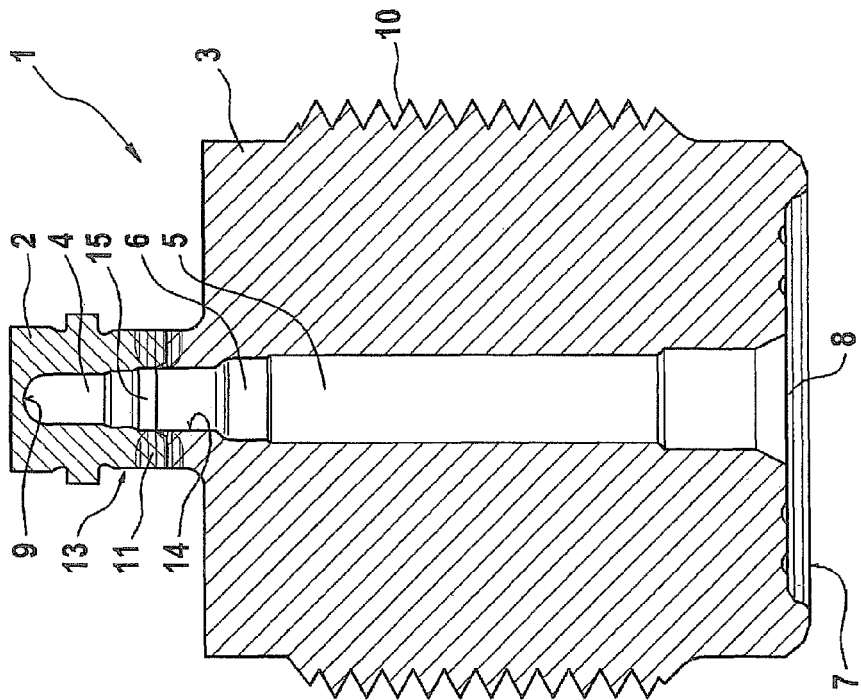
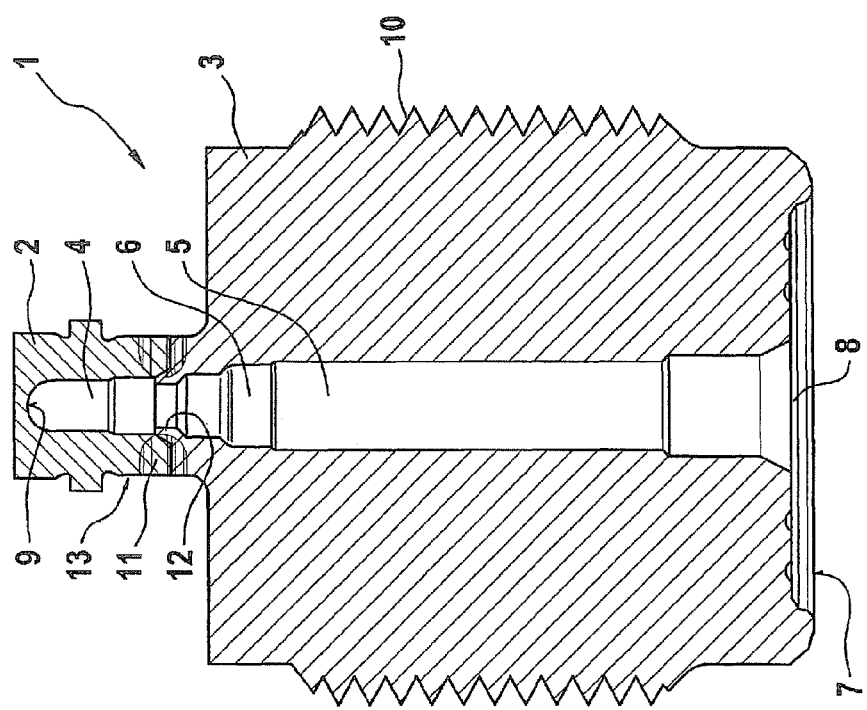

METHOD FOR PRODUCING A PRESSURE SENSOR ASSEMBLY AND PRESSURE SENSOR ASSEMBLY

Continuing Data of this application is a 371 of PCT/EP10/65692 10/19/2010.

FIELD OF THE INVENTION

The present invention relates to a method for producing a pressure sensor assembly, the pressure sensor assembly having a sensor housing element having a pressure sensor and a base housing element, which have a continuous recess accommodating the pressure sensor and are welded to each other. The present invention also relates to a pressure sensor assembly.

BACKGROUND INFORMATION

A pressure sensor assembly may be in multi-part form. In order to produce the pressure sensor assembly, the sensor housing element together with the pressure sensor and the base housing element are produced. Both the sensor housing element and the base housing element have a recess. It may be provided, in this context, that the recess of the sensor housing element is a blind recess, that is, it does not fully reach through the sensor housing element. By contrast, it is usually provided that the recess of the base housing element does fully reach through it. Thereafter, the sensor housing element and the base housing element are positioned so that the recess of the base housing element is flush with the recess of the sensor housing element, so that a continuous recess is formed. The pressure sensor is provided in the recess of the sensor housing element, in this instance. An operative pressure connection of the environment to the pressure sensor is produced by the continuous recess. After the alignment of the sensor housing element and the base housing element in such a way that the continuous recess created, the sensor housing element and the base housing element are welded together. This may be done, for example, using laser welding, resistance welding or electron beam welding.

In this context, in a connecting area of the base housing element or of the sensor housing element, in which the welding seam will subsequently be present, a weld pool backing is usually provided, in order to prevent material from getting into the recess during the welding. The weld pool backing is formed, in this context, by a tapering in the recess of the base housing element and the sensor housing element. In addition, a notch is created on the welding seam or on the weld root, because of the welding. The effect of the notch that is thus present reduces the stability of the welding connection, and thereby of the entire pressure sensor assembly. In addition to the effect of the notch, there is the circumstance that, because of the weld pool backing, a discontinuity in the rigidity between the sensor housing element and the base housing element superimposes additional shear stresses on the welding seam, or rather, the welding connection. The welding connection is additionally weakened by fusion occurring during the welding process, especially when highly tempered steels are used for the sensor housing element and/or the base housing element.

Consequently, conventional methods for producing the pressure sensor assembly are suitable only for producing pressure sensors for a certain pressure range. Conventionally, for instance, when using pressure sensor assemblies produced in this way, nominal pressures of up to 2400 bar are able to be measured. If the geometry of the sensor housing element or of the base housing element is to be optimized with respect to a higher resistance to compression of the pressure sensor assembly, this always has the effect that the welding becomes more difficult to carry out. In sensor housing elements and base housing elements which are designed only for high resistance to compression, the welding is frequently not possible at all. The geometry of the sensor housing element and the base housing element can therefore always be only a compromise between producibility and resistance to compression. European Patent No. EP 1 518 099 E1, for example, describes a device for measuring pressure, in which a pressure measuring cell made of high-grade steel is welded together with a connection piece.

SUMMARY

A method for producing the pressure sensor assembly in accordance with the present invention may have the advantage that the pressure sensor assembly produced is able to be used for measuring higher pressures, in particular greater than 2400 bar. According to the present invention, this is achieved by enlarging the recess of the base housing element and/or the sensor housing element by material removal, after the welding in the area of the welding connection. In this way, stresses occurring in the welding connection, in response to the application of pressure on the pressure sensor assembly, are able to be reduced. At the same time, the separation of the sensor housing element and the base housing element is maintained, which offers cost advantages in the production. In this connection, it is mentioned that the production of a single-part pressure sensor assembly would be very costly, since the pressure sensor would have to be applied onto this single-part pressure sensor assembly.

In addition, in the case of the multi-part embodiments of the sensor housing element, it is possible to use different materials for the sensor housing element and the base housing element. In this way, additional costs can be saved and the material is able to be optimized for the respective task of the component. The material of the sensor housing element, in particular, has to have great purity, while the material used for the base housing element should be extremely hard. In conventional methods for producing the pressure sensor assembly, a certain weld penetration depth absolutely has to be maintained during the production of the welding seam. That is why the weld pool backing is provided. It prevents root fusion, that is, producing a welding connection in such a way that the welding connection grasps the inner wall of the recess. The example embodiment of the present invention does away with this restriction. In addition, the geometry of the sensor housing element and/or the base housing element is able to be optimized, with respect to producing the welding seam, without restrictions, without first having to take into account the compression resistance of the finished pressure sensor assembly.

These advantages may be achieved by the material removal that is carried out after the welding. The material removal, in this instance, takes place in the area of the finished welding seam, so that the recess of the base housing element and/or the sensor housing element is enlarged. In this context, for example, a weld pool backing, that is provided in the sensor housing element and/or the base housing element, may be eliminated. Heat cracks occurring on the surface of the welding connection, that is, on the inner wall of the recess, particularly during root fusion, may also be enlarged by the material removal. The material removal, in this context, takes place so that the geometry of the sensor housing element and/or the base housing element is optimized with respect to the resistance to compression of the pressure sensor assembly after the welding. This means that there are no diameter changes any more in the continuous recess, preferably after the material removal in the area of the welding connection. Thus, especially in the area of the welding connection, constant dimensions of the recess are ideally provided. Thus, we have a cylindrical, especially preferred, circular-cylindrical recess. Using the example method according to the present invention, it is possible to produce the pressure sensor assembly, both in a simple manner of a plurality of elements to be welded, and to obtain a pressure sensor assembly designed for high pressures.

One refinement of the present invention provides that, during the material removal, a weld pool backing and/or a part of the welding connection be removed. As was pointed out above, the dimensions of the continuous recess are enlarged by the material removal. The weld pool backing is able to be removed at least in regions, in this context. Additionally or alternatively, it is possible that a part of the welding connection is removed, particularly that part which grabs the inner wall of the recess or the weld pool backing.

One refinement of the present invention provides that the welding take place from the outer side of the sensor housing element and the base housing element. Thus, first of all, the sensor housing element and the base housing element are positioned with respect to each other in such a way that the continuous recess is formed from the respective recesses. The recesses of the sensor housing element and the base housing element are preferably situated coaxially, in this context. Thereafter, the welding is carried out starting from the outer side of the pressure sensor assembly. A certain weld penetration depth may be set in this context, that is, the depth to which the welding connection penetrates the material of the sensor housing element and the base housing element. It is particularly preferred to produce a continuous welding connection, that is, to weld through the material of the sensor housing element and the base housing element yielding root fusion. This makes it possible to produce a very stable welding connection.

One refinement of the present invention provides that the welding connection is produced grasping an inner wall of the recess and/or grasping the weld pool backing. The former is provided particularly if the intention is to weld through the material of the sensor housing element and the base housing element. In this case, the welding connection extends in the axial direction from an outer wall of the pressure sensor assembly all the way to the inner wall of the recess. The root fusion can be provided with or without weld pool backing. If weld pool backing is provided, it may also be provided that the welding connection is not produced continuously, but only in such a way that it extends in the radial direction from the outer wall all the way to the weld pool backing. In this way, too, a reliable and safe welding connection is able to be produced. However, as described above, the weld pool backing impairs the resistance to compression of the pressure sensor assembly. This impairment is removed, however, by material removal in the area of the welding connection.

One refinement of the present invention provides that the sensor housing element and the base housing element are produced from different materials. This is made possible by a multi-part embodiment of the pressure sensor assembly. The respectively different requirements for the sensor housing element and the base housing element are taken into account in the selection of the material. For instance, in the case of the sensor housing element, which has the pressure sensor, highly tempered steel is used, whereas for the base housing element a very hard material is selected.

One refinement of the present invention provides that the material removal is performed by drilling, milling and/or electrochemical machining. In the drilling, the continuous recess is drilled out at least in the area of the welding connection. Using this procedure, greater quantities of material may also be simply removed. However, drilling is not suitable for every geometry and for every surface quality that is to be achieved. In contrast, if the material removal is made by milling, a greater surface quality may be attained. In addition, the geometry of the continuous recess may be designed comparatively freely. However, milling is connected with higher costs in producing the pressure sensor assembly. For this reason, it is advantageous if the geometry of the sensor housing element, the base housing element or the continuous recess is optimized in such a way that as small a quantity of material has to be removed as possible. Using electrochemical machining (ECM method), almost any desired geometry of the recess may be produced, having a very good surface quality. The costs and the processing time for electrochemical machining are a direct function of the quantity of the material to be removed, which is why the geometry should also be optimized appropriately in this case. In electrochemical machining, the geometry of the recess may be designed without compromise for the optimization of the potential gradient.

One refinement of the present invention provides that the pressure sensor is applied as substrate on an area of the sensor housing element. The pressure sensor may be based on a thin film, for example, thus the thin film has to be applied onto at least one area of the sensor housing element. In this context, the pressure sensor is made up of at least one resistor produced in thin film technology. A plurality of resistors is preferably provided, which form a Wheatstone bridge. Therefore, the pressure sensor is situated, in this case, at the lowest point of the recess, i.e., at an end region of the recess.

One refinement of the present invention provides that a screw thread is developed on the base housing element. Using the screw thread, the entire pressure sensor assembly is able to be screwed into a device in which the pressure is to be determined. The screw thread is put on preferably before the welding, but it is alternatively also possible to produce the screw thread on the base housing element only after the welding.

The present invention also relates to a pressure sensor assembly, particularly if produced using the method described above, the pressure sensor assembly having a sensor housing element having a pressure sensor and a base housing element, which have a continuous recess accommodating the pressure sensor and are welded to each other. It is provided in this instance that the welding connection grasps an inner wall of the recess of the base housing element and/or of the sensor housing element. Such a development was not practicable up to now in conventional pressure sensor assemblies, because the welding connection, which grasps the inner wall of the recess, reduces the resistance to compression of the pressure sensor assembly. However, it is not necessary, in this case, that the welding connection grasps the inner wall, already during the production of the welding connection. Rather, this may be the case, as described above, only after the recess of the base housing element and/or the sensor housing element has been enlarged by the removal of material. Therefore, before the material removal, for example, the weld pool backing may perfectly well be provided on the sensor housing element or the base housing element, and the welding connection may extend to the former only in the radial direction. Consequently, the welding connection grasps the inner wall of the recess, either of the base element, the sensor housing element, or of both, only after the removal of the material.

One refinement of the present invention provides that the sensor housing element and/or the base housing element are made up, at least in regions, of high-grade steel. In this context, the sensor housing is preferably made of a highly tempered high-grade steel, while the base housing element is made of an extremely hard high-grade steel at least in a sealing region.

The present invention will be described in greater detail below with the aid of the exemplary embodiments shown in the figures.

BRIEF DESCRIPTION OF THE DRAWINGS

FIG. 1 shows a cross section through a pressure sensor assembly having a sensor housing element and a base housing element according to a first production step.

FIG. 2 shows the pressure sensor assembly according to a second production step.

DETAILED DESCRIPTION OF EXAMPLE EMBODIMENTS

FIG. 1 shows a cross section through a pressure sensor assembly 1 according to a first production step. Pressure sensor assembly 1 is made up of a sensor housing element 2 and a base housing element 3. Sensor housing element 2 has a first recess 4 and base housing element 3 has a second recess 5. Sensor housing element 2 is situated in such a way with respect to base housing element 3 that recesses 4 and 5 are situated coaxially with respect to each other, and thus form a continuous recess 6. Recess 4 is developed as a blind opening, and is thus only open in the direction of recess 5. By contrast, recess 5 reaches through base housing element 3 completely, so that continuous recess 6 ends in it on the side of sensor housing element 2, and on the side of base housing element 3 it opens out into a side surface 7 of pressure sensor assembly 1, and thus a connecting opening 8 is developed.

At the lowest point of recess 6, that is, in the region of sensor housing element 2, a pressure sensor (not shown) has been applied. The pressure sensor is based on a thin film pressure measuring concept, and is applied directly onto a recess base 9 of pressure sensor assembly 1, or rather of sensor housing element 2. On its outside, base housing element 3 has a screw thread 10, using which, pressure sensor assembly 1 is able to be screwed into a device in which the pressure is determined. In this case, the additional device, via connecting opening 8, makes effective pressure contact with the pressure sensor, which then generates a signal that corresponds to the pressure.

Recesses 4 to 6 have a generally circular cross section. However, in the axial direction of recess 6 different diameters are provided. For instance, in the vicinity of welding connection 11, a weld pool backing 12 is developed by a lessening in the inside diameter of recess 6. In the present example, weld pool backing 12 is present in recess 5 of base housing element 3. However, in addition or alternatively, it could equally well be situated in recess 4 of sensor housing element 2. Welding connection 11 is used for connecting the sensor housing element to base housing element 3 in a permanent and pressure-resistant manner. In this context, pressure sensor assembly 1 is basically for pressures greater than 2400 bar. Welding connection 11 or entire pressure sensor assembly 1 thus has to be designed for such a pressure.

The specific embodiment of pressure sensor assembly 1 shown in FIG. 1 is first optimized for welding that is easy to perform. That is why weld pool backing 12 is provided, which prevents damage to pressure sensor assembly 1. After the production of welding connection 11, it has a notch, however, on the welding seam, or rather the welding seam root. Therefore, there is a notch effect present, which increases the stress occurring at welding connection 11. In addition, because of weld pool backing 12, a discontinuity in the rigidity between sensor housing element 2 and base housing element 3 superimposes additional shear stresses on welding connection 11. Welding connection 11 is additionally weakened by fusion occurring during the welding process. This means that pressure sensor assembly 1, as shown in FIG. 1, is not yet designed for use at high pressures, but it enables a simple production of welding connection 11. In this context, the welding process takes place starting from an outer side 13 of sensor housing element 2 and base housing element 3. The welding connection, in this instance, is present in such a way that it grasps weld pool backing 12, which is formed by the lessening of the diameter of recess 5.

After a second production step, the pressure sensor assembly known from FIG. 1 is present as shown in FIG. 2. During the second production step, recess 6 is enlarged by material removal in the area of the welding connection. The material removal, in this context, may take place either in the area of recess 4 of sensor housing element 2, of recess 5 of base housing element 3, or of both. The only thing that is decisive is that, following the material removal, there are no changes present in the dimensions of recess 6 in the area of welding connection 11. This means, for example, that weld pool backing 12 and/or a part of welding connection 11 are removed. In the specific embodiment shown here, weld pool backing 12 is completely removed in the second production step. Thus, after the second production step, welding connection 11 grasps an inner wall 14 of recess 6 or at least one of recesses 4 and 5. The material removal may take place, in this case, by drilling, milling or electrochemical machining. The specific embodiment of pressure sensor assembly 1 shown in FIGS. 1 and 2 is optimized for the material removal using drilling.

FIG. 2 shows drilled-out recess 6, the drilled-out diameter being as small as the tolerances of welded pressure sensor assembly 1 permit. In order to keep the stresses in the area of welding connection 11 as small as possible, the difference between the drilled-out diameter and the diameter of recess 4 of sensor housing element 2 have to be as small as possible. It is provided advantageously that the drilled-out diameter corresponds to the diameter of recess 4 in a connecting region 15. Connecting region 15 is the region of recess 4, using which it opens out into recess 5. The notch effect of welding connection 11 is eliminated in this way, whereby the stress (effective stress) is reduced in this region. Moreover, the discontinuity in the rigidity between sensor housing element 2 and base housing element 3 is greatly reduced and shifted to a region aside of welding connection 11. Heat cracks on a surface of welding connection 11, that were possibly created during welding, are also removed by metal removal. Welding connection 11 is present in an encircling manner, that is, it is developed over the entire circumference of pressure sensor assembly 1. In this way, one is able to achieve superb sealing of welding connection 11 between sensor housing element 2 and base housing element 3. A pressure sensor assembly 1 produced in this way, without anything further, may have applied to it a pulsating pressure of up to 3300 bar.

Because of the material removal in the area of welding connection 11, carried out after the welding, a high resistance to compression of pressure sensor assembly 1 and simple producibility may be achieved at the same time. The last-named includes, in particular, the multi-part development of pressure sensor assembly 1, in which sensor housing element 2 and base housing element 3 are made of different materials.

What is claimed is:

1. A method for producing a pressure sensor assembly, the pressure sensor assembly including a sensor housing element having a pressure sensor, and a base housing element, the sensor housing and the base housing having a continuous recess to accommodate the pressure sensor, the method comprising:
welding the sensor housing and the base housing to each other to form a welding connection; and
enlarging, in the area of the welding connection, a recess of at least one of the base housing element and the sensor housing element by material removal after the welding.

2. The method as recited in claim 1, wherein in the material removal, at least one of a weld pool backing and a part of the welding connection are removed.

3. The method as recited in claim 1, wherein the welding takes place from an outside of sensor housing element and of base housing element.

4. The method as recited in claim 2, wherein the welding connection is produced by its grasping at least one of an inner wall of the recess, and the weld pool backing.

5. The method as recited in claim 1, wherein the sensor housing element and the base housing element are made from different materials.

6. The method as recited in claim 1, wherein the material removal takes place using at least one of drilling, milling, and electrochemical machining.

7. The method as recited in claim 1, wherein the pressure sensor is applied to an area of the sensor housing element as a substrate.

8. The method as recited in claim 1, wherein a screw thread is provided on the base housing element.

9. A pressure sensor assembly, comprising:
a sensor housing element having a pressure sensor; and
a base housing element, the sensor housing element and the base housing element having a continuous recess to accommodate the pressure sensor, and being welded to each other via a welding connection;
wherein the welding connection grasps an inner wall of at least one of the recess of the base housing element and the recess of the sensor housing element.

10. The pressure sensor assembly as recited in claim 9, wherein at least one of the sensor housing element and the base housing element are made of high-grade steel, at least in regions.

* * * * *